(No Model.)

W. B. JOHNSON.
HANDLE FOR COFFEE POTS, &c.

No. 533,538. Patented Feb. 5, 1895.

WITNESSES:
Fred White
C. K. Fraser.

INVENTOR:
Walter B. Johnson,
By his Attorneys,
Arthur C. Fraser & Co.

THE NORRIS PETERS CO., PHOTO-LITHO., WASHINGTON, D. C.

UNITED STATES PATENT OFFICE.

WALTER B. JOHNSON, OF ROME, NEW YORK.

HANDLE FOR COFFEE-POTS, &c.

SPECIFICATION forming part of Letters Patent No. 533,538, dated February 5, 1895.

Application filed October 2, 1893. Serial No. 487,043. (No model.)

*To all whom it may concern:*

Be it known that I, WALTER B. JOHNSON, a citizen of the United States, residing in Rome, in the county of Oneida and State of New York, have invented certain new and useful Improvements in Handles for Coffee-Pots and other Vessels, of which the following is a specification.

This invention relates to that class of handles wherein one or more arms suitably attached to the pot or vessel project laterally and at their outer ends carry the handle, which latter is usually of non-conducting material. In such handles it is usual to construct the arms with curved pot ends extending substantially at right angles to the handle portion of the arm, which pot ends are turned either both downwardly, or the lowermost downwardly and the upper one upwardly, for attachment to the pot, as desired.

The invention aims to provide an improved handle of this character which can be easily and securely applied to the pot after the latter and the handle arms have been completely finished.

To this end in carrying out the preferred form of my invention, I provide handle arms and a handle of improved construction, the arms being capable of attachment to the pot with their curved ends disposed either upwardly or downwardly prior to the attachment of the handle piece, and an improved construction of handle which can be passed over the ends of the arms after their completion and firmly connected thereto. To this end I construct the arms at their handle ends with pin grooves, disposed to intersect the center of the arm, and I construct the arms to engage the handle piece in two positions, either with the bent end downwardly or with this end upwardly, whereby when in either position in engagement with the handle, their pin grooves where intersecting the center of the arm are disposed in substantially the same position within the handle; and I construct the handle piece with arm-receiving sockets closed at their inner ends for receiving and taking over the outer end of the arm preferably in either its downturned or upturned position, and with a pin-hole corresponding with the position of the pin groove in the arm when the end of the latter is in the handle piece, independently of which position the arm occupies; and I provide a pin traversing the pin-hole of the handle piece and entering the pin aperture of the arm and locking the two together and embedded at its point beyond said arm in the material of the handle piece.

Figure 1:
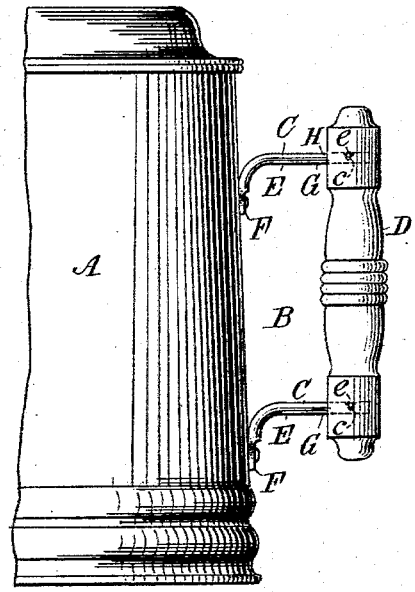
Figure 2:
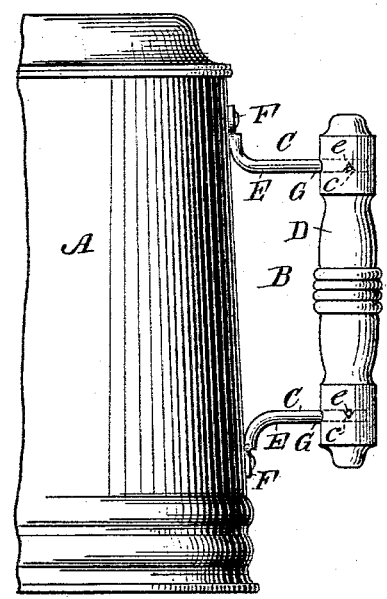
Figure 3:
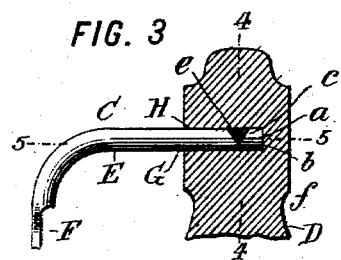
Figure 4:
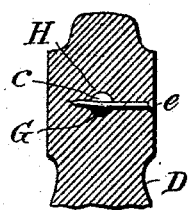
Figure 5:
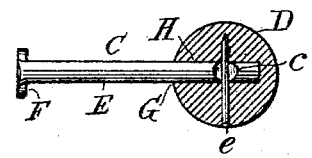
Figure 6:
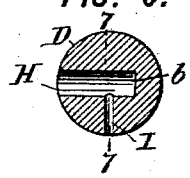
Figure 7:
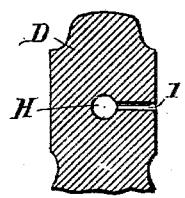

In the accompanying drawings, which illustrate the preferred adaptation of my invention, Figure 1 is a fragmentary side elevation of a coffee pot provided with my improved handle, the pot ends of the handle arms being both turned downwardly. Fig. 2 is a similar view, the pot end of the lower arm being turned downwardly and that of the upper arm turned upwardly. Fig. 3 is an enlarged fragmentary view showing the upper arm in elevation, and a corresponding portion of the handle in mid-section. Fig. 4 is a fragmentary axial section thereof on the line 4—4 in Fig. 3. Fig. 5 is a horizontal section thereof on the line 5—5 in Fig. 3. Fig. 6 is a horizontal section of the handle through the arm socket and pin-hole. Fig. 7 is a vertical axial section thereof cut on the line 7—7 in Fig. 6.

Referring to all the drawings, let A indicate the pot, B the handle thereof as a whole, C the handle arms, and D the handle piece.

The pot A is of any usual construction.

The handle arms C may be of metal or other suitable material, and of any general construction. As shown, they consist of cylindrical pieces of wire E E having bent and flattened pot ends F, and cylindrical handle ends G. The pot ends F are riveted or otherwise fastened to the wall of the pot A, either with both ends turned downwardly, as shown in Fig. 1, or one upwardly and the other downwardly as shown in Fig. 2.

The handle D may be of any material, but generally it is constructed of wood or other non-conducting substance, and as heretofore it has arm-sockets H extending transversely or at right angles to its axis and receiving the handle ends G of the arms C.

According to the preferred form of my invention I construct the handle ends G of the arms C to enter the sockets H of the handle either in the position occupied when the pot end of the arm is turned down, or in the reverse position occupied when this end is turned up, and I construct the socket H to receive and conceal the arm end in either position and provide an improved means for fastening the parts together after the arm is fixed to a pot. This is preferably accomplished by constructing the handle end of the arm as a cylinder and making the socket H cylindrical. The end G of the arm is preferably constructed of a predetermined length, and has a blunt end face a, while the socket H is likewise constructed of a predetermined depth and has a blunt inner end b, whereby when the arm is pushed home within the socket, the arm and handle piece occupy predetermined relative positions. Preferably the socket is a tight fit with the handle end of its arm, whereby a neat joint is made between the two. When thus constructed the arm C can be attached to and finished with the pot A before the handle piece D is applied to the arm, whereby all danger of injury to the handle piece during the finishing of the pot and arms, or the attachment of the latter to the pot, is avoided, and after finishing, the handle piece can be placed in position by passing its arm sockets H over the projecting handle ends G of the arms, and pressing the two together until said ends are forced home in said sockets. The handle end of each arm is provided with a transversed pin groove, and a pin engaging this groove and extending transversely or at right angles to the arm, its socket and the axis of the handle piece, is provided in the handle. This is best accomplished by constructing the arm with a transverse pin-groove c, which may be punched, sawed or otherwise suitably cut, and which groove preferably traverses the arm laterally at a point coinciding, when the arm is home in its socket H, with the axis of the handle piece. Preferably the pin groove intersects or extends across the axial center of the handle end G of the arm from its periphery inwardly, as shown, whereby in either position of the arm this groove at its point of intersection with the axis of the arm, will occupy the same position within the handle piece. The pin e engages with and preferably traverses the pin groove c of the arm. I have shown a small nail or brad which I prefer to employ as the pin e, but any suitable equivalent device may be substituted therefor. The pin is disposed transversely of the handle piece D, and crosses the axis of the arm in its engagement with the pin groove c of the latter. Preferably c is a groove, the inner portion f of which projects slightly above the normal position of the adjacent portion of the pin e, whereby as the latter is driven into and engages with the groove it is slightly deflected by the walls of the latter, and thus its inner end is wedged slightly upwardly, or downwardly, as the case may be, as shown in Figs. 3 and 4, which action serves to increase the firmness of the engagement between the pin and arm. As shown, the pin E traverses the arm at right angles thereto.

As the pin groove c occupies a definite position within the handle piece, the pin may if desired be driven into the latter at this known point without previously boring the hole for its passage, but I prefer to construct the handle piece with a pin-hole I, extending at right angles to its axis and to the axis of its socket, which preferably traverses the handle radially and in line with the axis of the socket H, from the outer periphery of the handle to the inner periphery of the socket. This pin-hole thus accords with the pin groove c of the arm. Preferably this hole does not continue in the body of the handle piece at the opposite side of the socket, but the material of the piece at this side is left to be penetrated by the inner end of the pin e, thus insuring that the latter shall be embedded and concealed at its point beyond the arm in, and make firm engagement with the handle piece when driven home. The pin hole I is a tight fit with the pin e, and both are so small that after driving a neat joint is obtained, and the head of the pin can be easily concealed so that its presence will not be noticeable.

In operation, the arms C are fixed at top and bottom to the wall of the pot in such position as desired. The pot and arms are then finished, plated, and polished. The handle piece D is then passed over the handle ends of the arms and pushed home. The pins e are then passed into the pin holes I until they engage with the pin grooves of the arms. They are then driven home and the handle is complete.

It will be seen that my invention provides an improved handle for coffee pots and other vessels which is simple and strong in construction. and which can be readily applied, and it will be understood that the invention is not limited to all the peculiar features of construction and arrangement hereinbefore set forth as constituting its preferred form, as the invention may be availed of according to such modifications as circumstances or the judgment of those skilled in the art may dictate, without departing from its essential features.

What I claim is, in handles for coffee-pots and other vessels, the following-defined novel features and combinations, substantially as hereinbefore set forth, namely:

1. In a handle for coffee pots and other vessels, the combination with the pot, of two arms, attached to different points of the pot at one end, each having a transverse groove at its other end, said arms projecting with their grooved ends parallel and in the same vertical plane, an elongated handle-piece having two transverse sockets closed at their inner ends, each coinciding in position with, and receiving the grooved end of, one of said arms, and pins extending at right angles to the axes of said handle-piece and its sockets, carried by said handle-piece, each of said pins traversing said groove of one of said arms, embedded and concealed at its point in the material of said handle piece beyond said arms, and each of said pins locking one of said arms and said handle-piece together, whereby the handle-piece can be applied to the arms after the arms are fixed to and finished with the pot, the inner ends of said arms and pins are concealed and said pins are fixed in position by their embedded points, substantially as and for the purpose set forth.

2. In a handle for coffee pots and other vessels, the combination with an arm having a laterally extending pot end for attachment to the pot, and a handle end for attachment to a handle-piece, said handle end having a transverse pin groove intersecting its axial center, of a handle-piece for attachment to said arm, having an arm socket extending transversely of its axis, closed at its inner end, and receiving and engaging the handle-end of said arm in either of two diametrically opposite positions of the latter, said handle-piece having a pin-hole in the plane of the axis of said socket, extending at right angles to the axes of said socket and handle-piece, and coinciding with the position of said pin-groove when said arm is seated in said socket, and a pin in said pin-hole traversing said groove in either position of said arm, embedded at its point in the material of said handle-piece beyond said arm, and locking said arm in said socket, whereby said handle-piece can be applied to said arm after the latter has been fixed in either position to a pot, the inner ends of the arm and pin are concealed, and said pin is fixed in position by its embedded point, substantially as and for the purpose set forth.

In witness whereof I have hereunto signed my name in the presence of two subscribing witnesses.

WALTER B. JOHNSON.

Witnesses:
 HARRY M. REDDIG,
 GEORGE L. SHELLEY.